(12) United States Patent
Boyle

(10) Patent No.: US 8,621,133 B1
(45) Date of Patent: Dec. 31, 2013

(54) READING MULTIPLE METADATA FILES ACROSS MULTIPLE TRACKS

(75) Inventor: William B. Boyle, Lake Forest, CA (US)

(73) Assignee: Western Digital Technologies, Inc., Irvine, CA (US)

(*) Notice: Subject to any disclaimer, the term of this patent is extended or adjusted under 35 U.S.C. 154(b) by 726 days.

(21) Appl. No.: 12/826,602

(22) Filed: Jun. 29, 2010

(51) Int. Cl.
*G06F 12/00* (2006.01)
*G06F 3/06* (2006.01)

(52) U.S. Cl.
USPC .......................................................... 711/4

(58) Field of Classification Search
USPC .......................................................... 711/4
See application file for complete search history.

(56) References Cited

U.S. PATENT DOCUMENTS

| | | | |
|---|---|---|---|
| 5,666,531 A * | 9/1997 | Martin | 1/1 |
| 6,202,121 B1 | 3/2001 | Walsh et al. | |
| 6,339,811 B1 | 1/2002 | Gaertner et al. | |
| 6,745,340 B1 * | 6/2004 | Liu et al. | 714/5.11 |
| 7,669,044 B2 | 2/2010 | Fitzgerald et al. | |
| 2003/0043495 A1 * | 3/2003 | Mayer | 360/75 |
| 2007/0219917 A1 * | 9/2007 | Liu et al. | 705/59 |
| 2008/0256295 A1 | 10/2008 | Lambert et al. | |
| 2011/0196987 A1 * | 8/2011 | Benhase et al. | 709/247 |

* cited by examiner

*Primary Examiner* — Alford W. Kindred
*Assistant Examiner* — Craig Goldschmidt

(57) ABSTRACT

A disk drive comprising a rotatable disk, a head configured to read data from the disk, and a controller is disclosed. The controller is configured to read a plurality of track metadata files from the disk during one revolution of the disk using the head, wherein each track metadata file defines logical address to physical address mapping for a track of the disk, each track metadata file is located on a different track of the disk, and the track metadata files are located at track locations such that one of the track metadata files is read shortly after a track-to-track seek from a previous track.

20 Claims, 6 Drawing Sheets

```
                Time Stamp

PBA         LBA
           5000        21556
           5001        2
           5002        380
            ⋮           ⋮
           5050        560
```

US 8,621,133 B1

READING MULTIPLE METADATA FILES ACROSS MULTIPLE TRACKS

BACKGROUND

Disk drives are commonly used to store data in computers, data bases, digital video recorders, and other devices. A disk drive comprises a rotating magnetic disk and a head actuated over the disk to magnetically write data to and read data from the disk. The disk drive may write data to and read data from the disk in response to write/read commands from a host that uses the disk drive for data storage. Typically, the host addresses data stored in the disk drive using logical addresses. The disk drive maintains a mapping table mapping the logical addresses from the host to physical addresses of the corresponding data on the disk. When the host later requests data from the disk drive at certain logical addresses, the disk drive uses the mapping table to locate the requested data on the disk.

The disk drive may update the mapping table in a buffer as the disk drive writes data from the host to the disk. The disk drive may later write the updated mapping table in the buffer to the disk for later use. However, the disk drive may be not write the updated mapping table to the disk, for example, due to power lose or other reason. Therefore, it is desirable for the disk drive to be able to quickly reconstruct the updated mapping table.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
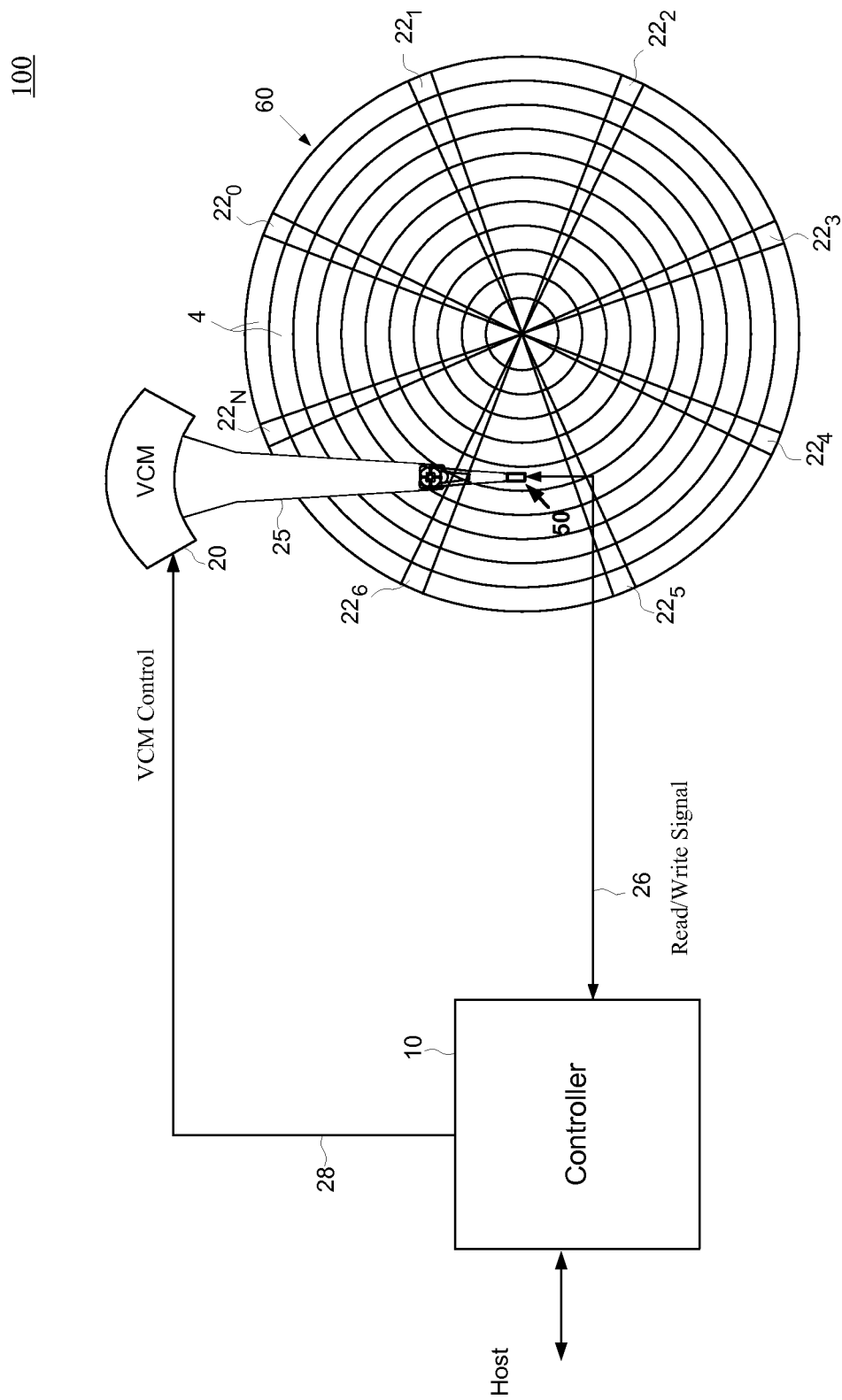
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk drive 100 also includes a spindle motor (not shown) for rotating the disk during read/write operations.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The disk 60 comprises a number of radially spaced, concentric tracks 4. Each track 4 may be divided into a number of sectors (shown in FIG. 2) that are spaced circumferentially along the track 4. The sectors may be used to store user data and/or other information. The disk 60 may also comprise a plurality of angularly spaced servo wedges $22_0$-$22_N$, each of which may include embedded servo information that can be read from the disk 60 by the head 50 to determine the position of the head 50 over the disk 60. For example, each servo wedge $22_0$-$22_N$ may include a pattern of alternating magnetic transitions (servo burst), which may be read from the disk 60 by the head 50 and processed by the controller 10 to estimate the position of the head 50 relative to the disk 60. The angular spacing between the servo wedges $22_0$-$22_N$ may be uniform, as shown in the example in FIG. 1.

To write data to the disk 60, the controller 10 may first position the head 50 at a desired track 4 on the disk 60 by sending a control signal input 28 (e.g., control current) to the VCM 20. The controller 10 may include a servo control system that positions the head 50 using the VCM 20 based on position information read from one or more servo wedges $22_0$-$22_N$. The controller 10 processes data to be written to the disk 60 into a write signal 26, which is outputted to the head 50. The head 50 converts the write signal 26 into a magnetic field that magnetizes the surface of the disk 60 based on the write signal, thereby magnetically writing the data to the disk 60.

To read data from the disk 60, the controller 10 positions the head 50 at a desired track 4 on the disk 60. The head 50 generates a read signal based on the magnetization of the disk surface under the head 50. The controller 10 receives and processes the read signal 26 into data, thereby reading the data from the disk 60.

The controller 10 may write data to and read data from the disk 60 in response to write/read commands from a host (e.g., host processor). When the controller 10 receives a host write command including data to be written to the disk 60, the controller 10 may temporarily hold the data from the host in a buffer (e.g., DRAM) and write the data from the buffer to the disk 60 using the head 50. When the controller 10 receives a host read command requesting data stored on the disk 60, the controller 10 may read the requested data from the disk 60, temporarily hold the read data in the buffer and send the read data from the buffer to the host.

The host may address data in write/read commands using logical block addresses (LBAs), in which each LBA addresses a block of data. The controller 10 may maintain a mapping table mapping the LBAs from the host to physical block addresses (PBAs) of the corresponding data on the disk 60. Each PBA may address a sector on the disk 60. When the controller 10 receives a host read command, the controller 10 uses the mapping table to map the LBAs in the read command to the PBAs of the requested data on the disk 60. The use of LBAs allows the host to address data stored in the disk drive 100 without having to know the physical locations of the data on the disk 60.

Figure 2:
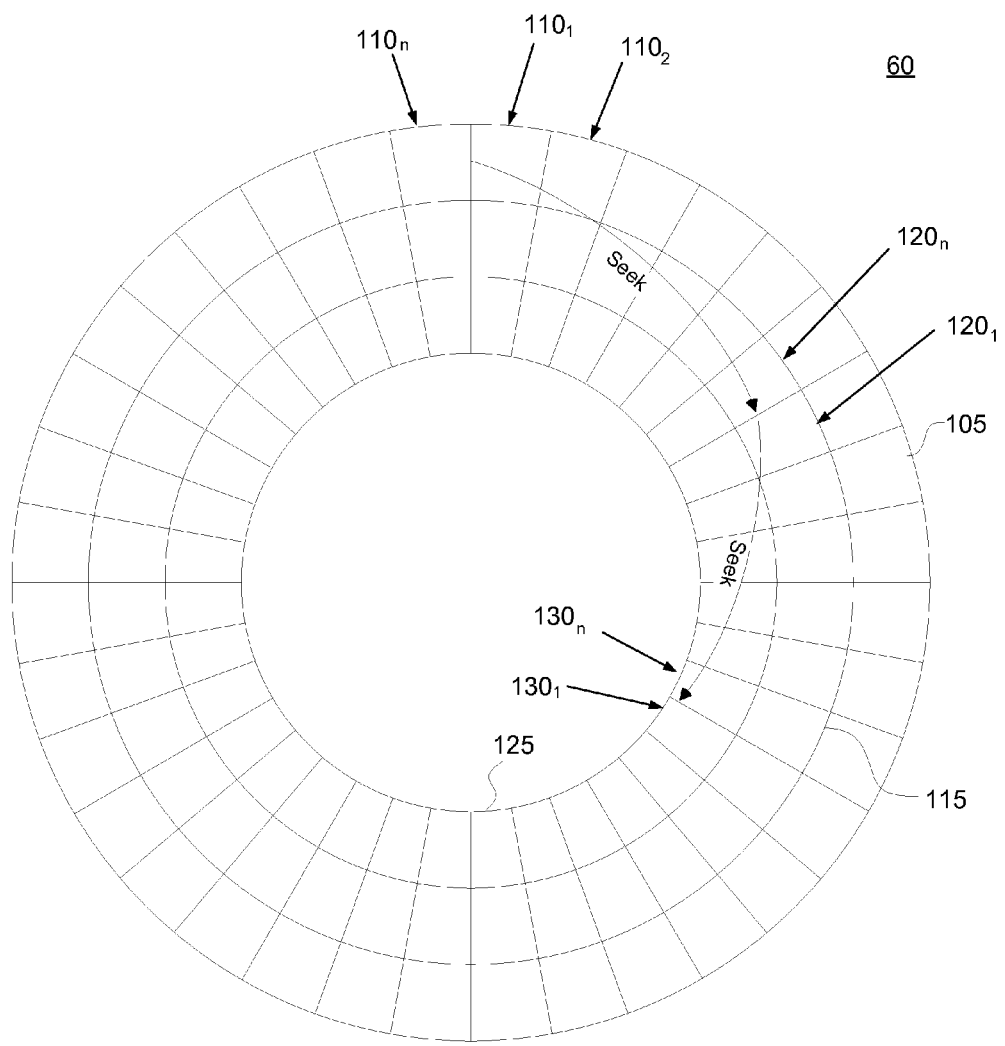
FIG. 2 illustrates an example of a disk according to an embodiment of the present invention.

The controller 10 may employ a dynamic LBA mapping scheme in which incoming data from the host is written to sequential tracks of the disk 60 regardless of the order of the LBAs of the data. An example of sequential track writing is illustrated in FIG. 2. FIG. 2 shows three consecutive tracks 105, 115 and 125 on the disk 60, in which each track is divided into a plurality of sectors. For ease of illustration, the servo wedges are not shown in FIG. 2. In this example, when the controller 10 receives data from the host, the controller 10 may position the head 50 at track 105 and begin writing data to track 105 starting at a first sector $110_1$ of the track 105. After writing data to the last sector $110_n$ of track 105, the controller 10 may seek the head 50 to track 115 (next track) and begin writing data to track 115 starting at a first sector $120_1$ of the track 115. After writing data to the last sector $120_n$ of track 115, the controller 10 may seek the head 50 to track 125 and begin writing data to track 125 starting at a first sector $130_1$ of the track 125. The controller 10 may continue this process until all of the data from the host is written to the disk 60. Although the tracks 105, 115 and 125 in this example are written in a direction from the outer diameter (OD) to the inner diameter (ID) of the disk 60, those skilled in the art will appreciate that the tracks 105, 115 and 125 may be sequentially written in the reverse direction from ID to OD.

In the example shown in FIG. 2, the first sectors $110_1$, $120_1$ of $130_1$ of the tracks are located at different angular positions on the disk 60. The angular skew between the first sectors of adjacent tracks allows the controller 10 to quickly begin writing data to a current track after seeking the head 50 to the current track from a previous track. This is because the angular skew accounts for rotation of the disk 60 during the track-to-track seek time (i.e., the time for the actuator to move the head 50 from the previous track to the current track). In the example shown in FIG. 2, after writing data to the last sector $110_n$ of track 105, the controller 10 seeks the head 50 to the next track 115 to write data to the next track. The first sector $120_1$ of the next track 115 is skewed from the first sector $110_1$ of track 105 so that, by the time the head 50 reaches the next track 115, the head 50 is positioned near the first sector $120_1$ of the next track 115 due to rotation of the disk 60 during the track-to-track seek time. This allows the controller 10 to begin writing to the next track 115 shortly after the track-to-track seek from the previous track 105.

The angular skew between the first sectors of adjacent tracks may be fixed and based on the angle that the disk 60 rotates during the track-to-track seek time. The angular skew may be given by a number of servo wedges between the first sectors of adjacent tracks (e.g., five servo wedges). The controller 10 may determine the position of the first sector of each track using an algorithm. For example, the algorithm may determine the position of the first sector of a particular track based on the angular skew between adjacent tracks and the number of tracks between the particular track and a reference track, where the position of the first sector of the reference track is known. This allows the controller 10 to determine which PBA in each track corresponds to the first sector in the track without having to store a table listing the PBA that corresponds to the first sector of each track.

As the controller 10 writes data from the host to sectors on the disk 60, the controller 10 may update the mapping table to map the LBAs of the data to the PBAs of the sectors on the disk 60. This allows the controller 10 to later locate the data on the disk 60 when the controller 10 receives a read command from the host requesting data at the corresponding LBAs. The controller 10 may temporarily store the mapping table in a buffer (e.g., DRAM) and update the mapping table in the buffer as the controller 10 writes data to the disk 60. The controller 10 may subsequently write the updated mapping table to the disk 60 within an area of the disk 60 reserved for the mapping table. However, if the controller 10 does not write the updated mapping table to the disk 60 (e.g., due to a power loss in the disk drive 100), then the controller 10 may lose the updates to the mapping table.

In one embodiment, as the controller 10 writes data to the disk 60, the controller 10 may also write metadata files to the disk 60. Each metadata file may include PBA to LBA mapping information for data in one or more tracks and/or sectors of the disk 60. In this embodiment, if the disk drive 100 loses power before the updated mapping table in the buffer can be written to the disk 60, then, on the next power cycle, the controller 10 can read the metadata files from the disk 60 and use the read metadata files to reconstruct the updated mapping table, as discussed further below.

Figure 3:
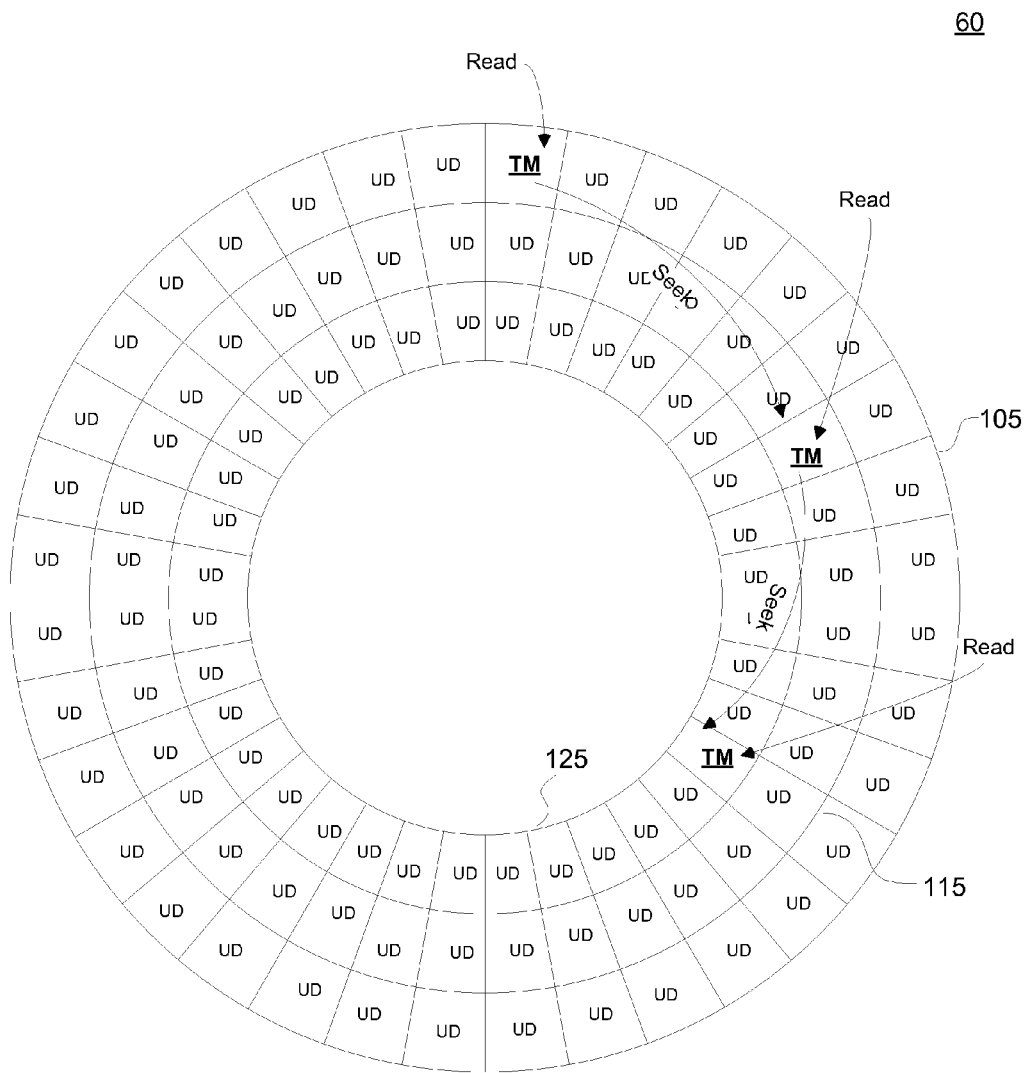
FIG. 3 illustrates an example of a disk where the tracks include track metadata files according to an embodiment of the present invention.
Figures 4, 5:
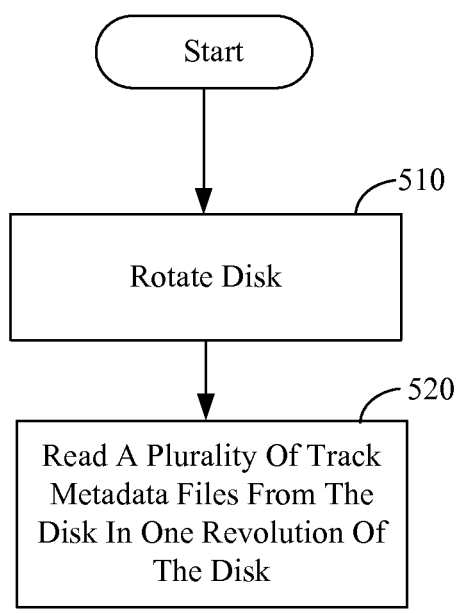
FIG. 4 illustrates an example of data stored in a track metadata file according to an embodiment of the present invention.
FIG. 5 is a flowchart of a method for reading multiple track metadata files across multiple tracks in one disk revolution according to an embodiment of the present invention.

FIG. 3 shows an example of metadata files written on the disk 60 with user data. In this example, each track 105, 115 and 125 includes a track metadata file (TM in FIG. 3) located at the first sector of the track. Each track metadata file may include PBA to LBA mapping information for user data in the previous track, the same track and/or a plurality of tracks. For the example where the track metadata file includes mapping information for the previous track, the track metadata file on track 115 includes mapping information for user data in track 105. Each track metadata file may also include a time stamp indicating the order in which the track metadata file was written to the disk 60 relative to other track metadata files on the disk 60. In one embodiment, the time stamp may be in the form of a sequence number that is incremented for each new track metadata file written to the disk 60. FIG. 4 shows an example of the data stored in a track metadata file. In this example, the track metadata file includes a time stamp, and PBAs mapped to corresponding LBAs for user data in the previous track, the same track and/or a plurality of tracks.

In this example, when the controller 10 writes user data on tracks of the disk 60, the controller 10 may also write track metadata files on the tracks. For each track, the controller 10 may write a track metadata file and user data on the track. For example, the controller 10 may write the track metadata file in the first sector of the track and then write user data on the rest of the track, as shown in the example in FIG. 3. The controller 10 may also write the track metadata file at another location on the track. The track metadata file may comprise PBA to LBA mapping information for user data in the previous track, the same track and/or a plurality of tracks.

As shown in the example in FIG. 3, the track metadata files on adjacent tracks are angularly spaced apart. As discussed further below, the angular skew between track metadata files on adjacent tracks allows the controller 10 to read multiple track metadata files across multiple tracks in one disk revolution.

A method for reading multiple track metadata files across multiple tracks in one disk revolution according to one embodiment will now be described with reference to FIG. 3. The controller 10 may read the track metadata files to construct a mapping table for user data stored on the disk 60. The controller 10 may also read track metadata files to reconstruct updates to the mapping table that are lost (e.g., due to a power loss in the disk drive), as discussed further below. The ability to read multiple track metadata files across multiple tracks in one disk revolution allows the controller 10 to quickly read the track metadata files from the disk 60.

In the embodiment shown in FIG. 3, the controller 10 reads the track metadata file on track 105. After reading the track metadata file on track 105, the controller 10 seeks the head 50 to track 115. The track metadata file on track 115 is angularly skewed from the track metadata file on track 105 so that, by the time the head 50 reaches track 115, the head 50 is positioned near the track metadata file of track 115 due to rotation of the disk 60 during the track-to-track seek time. This allows the controller 10 to read the metadata file on track 115 shortly after the track-to-track seek from track 105. After reading the track metadata file on track 115, the controller 10 seeks the head 50 to track 125 to read the track metadata file on track 125. The track metadata file on track 125 is angularly skewed from the track metadata file on track 115, allowing the controller 10 to read the track metadata file on track 125 shortly after the track-to-track seek from track 115. The controller 10 may continue this process until all of the desired track metadata files are read from the disk 60.

Thus, the angular skew between the track metadata files allows the controller 10 to read multiple track metadata files across multiple tracks in one disk revolution. The maximum number of track metadata files that can be read in one disk revolution may be approximately equal to the time for one disk revolution divided by the time for one track-to-track seek, assuming the time to read each track metadata file is short. In one embodiment, the track-to-track seek may be performed in less than a 90 degree rotation of the disk, which allows four or more track metadata files to be read in one disk revolution. In another embodiment, the track-to-track seek time may be performed in less than a 45 degree rotation of the disk. The angular skew between track metadata files on adjacent tracks may be made approximately equal to the angle the disk rotates during the track-to-track seek time or longer.

The track metadata file on a track may be located on any sector of the track as long as the angular skew between the track metadata files is maintained. For example, the track metadata file on each track may be located on the first sector of the track, as shown in the example in FIG. 3. In another example, the track metadata file on each track may be located on the last sector of the track. In this example, the track metadata file may include mapping information for user data on the same track.

In one embodiment, each track metadata file may include mapping information for user data in two or more tracks. This provides redundancies in the mapping information stored on the tracks in case the controller 10 is unable to read one or more of the track metadata files. For example, each track metadata file may include mapping information for user data in the previous two tracks or the previous track and the current track.

FIG. 5 is a flow diagram showing a method of reading track metadata files according to an embodiment of the invention. In step 510, the disk 60 is rotated. In step 520, the controller 10 reads a plurality of track metadata files from the disk 60 in one revolution of the disk. The controller 10 may perform step 510 by reading the track metadata file on a track, seeking the head 50 to the next track, reading the track metadata file on the next track and so forth until the plurality of track metadata files are read from the disk 60. The angular skew between the track metadata files allows the controller 10 to read the track metadata file on the next track shortly after the track-to-track seek from the previous track. The controller 10 may read the plurality of metadata files from three or more different tracks of the disk 60 in one disk revolution. The controller 10 may also control the VCM 20 to move the head 50 in a step-wise fashion to each of the different tracks during one disk revolution. The head 50 may stay on each track long enough to read the track metadata file on the track before seeking to the next track.

When the disk drive 100 is powered up, the controller 10 may read the mapping table from the disk 60 and temporarily store the mapping table in the buffer (e.g., DRAM). As the controller 10 writes new user data to the disk 60, the controller 10 may update the mapping table in the buffer to provide PBA to LBA mapping for the new user data. The controller 10 may periodically write the mapping table from the buffer to the disk 60 providing a "snap-shot" of the mapping table at the time the mapping table is written to the disk 60. The mapping table stored on the disk 60 may indicate the last track and/or PBA that was last updated at the time the "snap-shot" was taken. If the controller 10 is unable to write the mapping table in the buffer to the disk 60 after the "snap-shot," then the controller 10 may lose updates to the mapping table made after the "snap-shot." This may occur, for example, when the disk drive 100 experiences a power loss before the updates can be written to the disk 60.

In one embodiment, the controller 10 may read the track metadata files on the disk 60 to reconstruct updates to the mapping table. In this embodiment, the controller 10 may read the mapping table stored on the disk 60 and determine where the mapping table left off (e.g., the last track and/or PBA that was updated when the mapping table was written to the disk 60). The mapping table may indicate the last track and/or PBA that was updated in the mapping table. The mapping table may also indicate the time stamp of the track metadata file corresponding to the last track.

The controller 10 may then determine if data was written to the disk 60 after the mapping table was last written to the disk 60. For example, the controller 10 may read the time stamp of the track metadata file on the next track and compare the read time stamp with the time stamp in the mapping table. The controller 10 may determine that user data was subsequently written to the disk 60 when the read time stamp postdates the time stamp in the mapping table. In one embodiment, the time stamp may be in the form of a sequence number that is incremented for each new track metadata file written to the disk 60. In this embodiment, the mapping table may indicate the last sequence number at the time the mapping table was written to the disk 60. The controller 10 may then determine if data was subsequently written on the disk 60 by reading the sequence number of the track metadata file on the next track and determining whether the read sequence number is one number higher than the sequence number in the mapping table. If so, then the controller 10 may determine that data was subsequently written to the disk 60, and therefore that the mapping table needs to be updated.

After determining where the mapping table left off and that data was subsequently written to the disk 60, the controller 10 may begin reading track metadata files on the disk 60 starting from the track where the mapping table left off. The controller 10 may continue reading track metadata files on the disk 60 until the controller 10 reaches the track metadata file for the last user data written to the disk 60. The controller 10 may determine the last track metadata file based on the sequence numbers of the track metadata files. For example, if the controller 10 reads a sequence number on a current track that is not one number higher than the sequence number on the previous track, then the controller 10 may determine that the track metadata file on the previous track is the last track metadata file. In this example, the track metadata file on the current track may be a track metadata file for old user data that has not been overwritten. The controller 10 may also determine that the track metadata file on the previous track is the last track metadata file when the controller 10 does not read a track metadata file on the current track.

As discussed above, during the process of reading track metadata files on the disk 60, the controller 10 can read multiple track metadata files across multiple tracks in each disk revolution. This allows the controller 10 to quickly read the track metadata files on the disk 60 and update the mapping table. When the mapping table is updated at power up of the disk drive 100, the controller 10 can quickly update the mapping table and begin normal operations.

Figure 6:
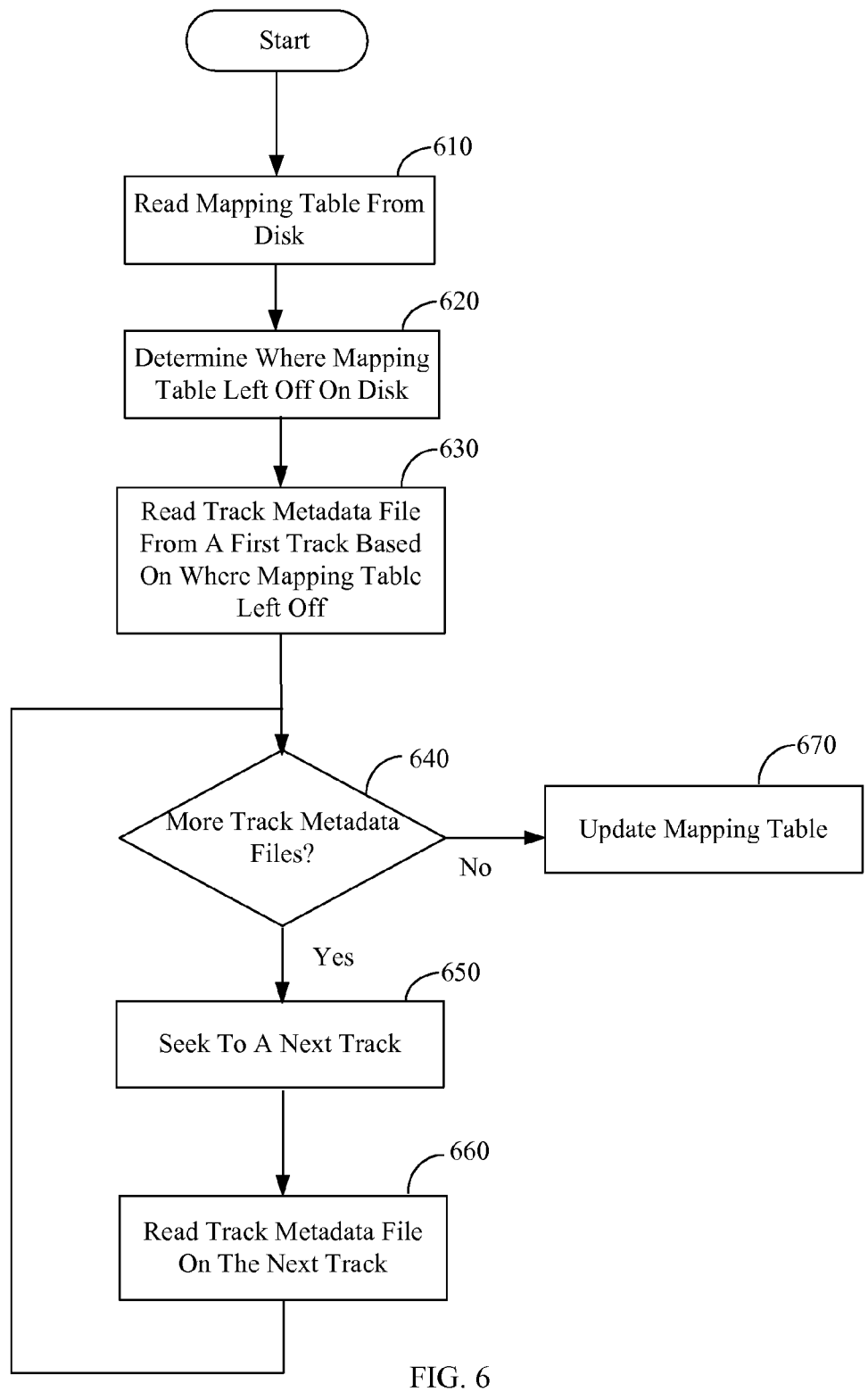
FIG. 6 is a flowchart of a method for updating a mapping table using track metadata files according to an embodiment of the present invention.

FIG. 6 is a flow diagram showing a method of updating the mapping table using metadata files according to an embodiment of the invention.

In step 610, the controller 10 reads the mapping table from the disk 60. In step 620, the controller determines where the mapping table left off on the disk. For example, the mapping table may indicate the track and/or PBA where the mapping table left off. In step 630, the controller 10 reads the track metadata file on a first track based on where the mapping table left off.

In step 640, the controller 10 determines if more track metadata files need to be read. For example, the controller 10 may determine that more track metadata files need to be read until the controller 10 reads a sequence number on a track that is not one number higher than the sequence number on the previous track. If the controller 10 determines that more data files need to be read, then the controller proceeds to step 650. Otherwise, the controller 10 proceeds to step 670.

In step 650, the controller 10 seeks the head 50 to the next track. In step 660, the controller reads the track metadata file on next track. The controller 10 then returns to step 640. Steps 650 and 660 may be performed multiple times in one disk revolution. This is because the controller 10 can read multiple track metadata files across multiple tracks in one disk revolution as discussed above.

In step 670, the controller 10 updates the mapping table using the read track metadata files. The controller 10 may update the mapping table as the track metadata files are read from the disk 60.

Figure 7:
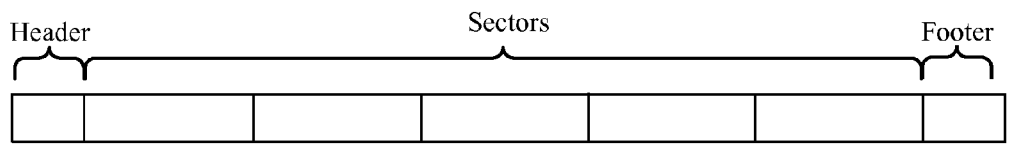
FIG. 7 illustrates an example of a container metadata file according to an embodiment of the present invention.

The metadata files on the disk 60 may also include container metadata files in addition to the track metadata files. Each container metadata file may include PBA to LBA mapping information for one or more sectors of the track. FIG. 7 shows an embodiment of a container metadata file comprising a header and a footer around a plurality of sectors. In this embodiment, the header and the footer may each comprise PBA to LBA mapping information for the user data in the sectors between the header and the footer. The header and the footer may include the same mapping information or different portions of the mapping information for the user data in the sectors. In another embodiment, the container metadata file may include only the header or the footer instead of both. In yet another embodiment, each sector may include both user data and a container metadata file providing PBA to LBA mapping for the user data in the sector. For ease of illustration, container metadata files are not shown in the example in FIG. 3. When the controller 10 writes user data on a track, the controller 10 may also write container metadata files on the track providing mapping information for the user data on the track. The controller 10 may intersperse the container metadata files with the user data on a track.

The controller 10 may write the container metadata files more frequently than the track metadata files. For example, the controller 10 may write a container metadata for each sector or several sectors on a track, where the container metadata file includes PBA to LBA mapping information for user data in the sector or several sectors.

The container metadata files may be used to provide mapping information for user data in a track in the event the controller 10 is unable to retrieve the mapping information from a track metadata file. From example, the controller 10 may write user data to only a portion of a track and not write a track metadata file for the user data. In another example, the disk drive 100 may lose power before the controller 10 is able to write a track metadata file for user data in a track. In these cases, the controller 10 can read the container metadata files on the track to retrieve the mapping information for the user data on the track.

Figure 8:
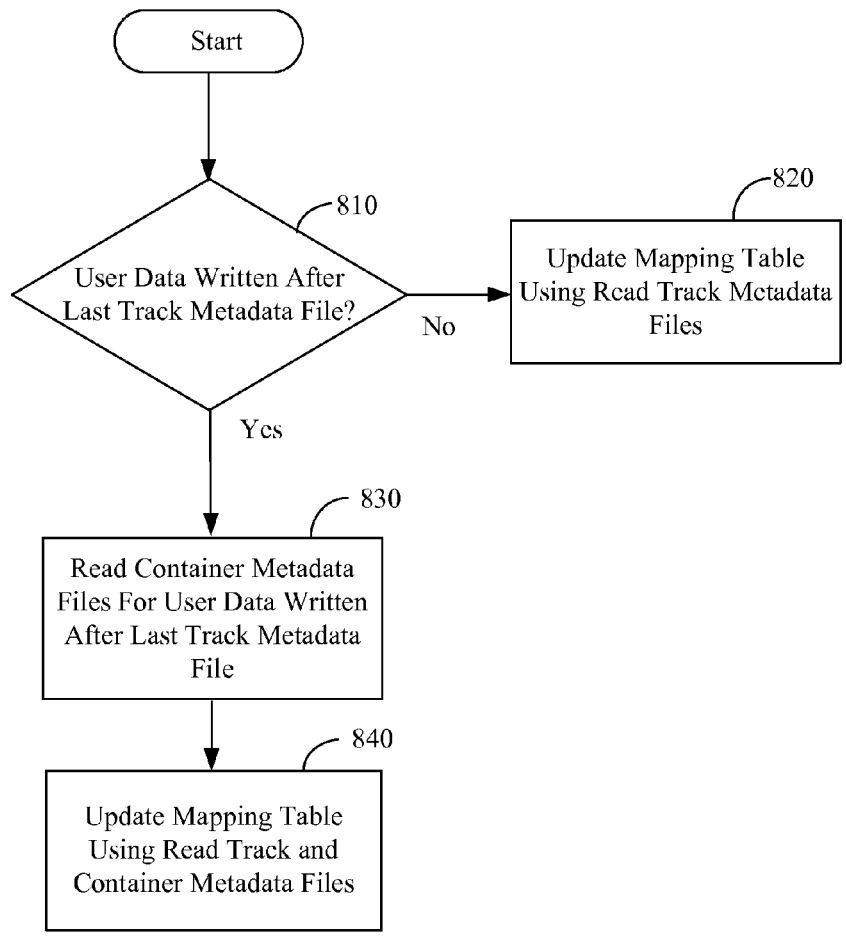
FIG. 8 is a flowchart of a method for updating a mapping table using track metadata files and container metadata files according to an embodiment of the present invention.

FIG. 8 is a flow diagram showing a method of updating the mapping table using metadata files according to an embodiment of the invention. The method in FIG. 8 may be performed after the controller 10 has determined that no more track metadata files need to be read in step 640 in FIG. 6.

In step 810, the controller 10 determine whether data has been written to the disk after the last track metadata file. The controller 10 may determine that data has been subsequently written to the disk when the next track is partially written with data. If the controller 10 determines that no subsequent data has been written to the disk 60, then the controller 10 updates the mapping table using the read track metadata files in step 820. The read track metadata files may be obtained from the method in FIG. 6. If the controller 10 determines that subsequent data has been written to the disk 60, then the controller 10 proceeds to step 830.

In step 830, the controller reads the container metadata files for the user data written to the disk 60 after the last track metadata file. In step 840, the controller uses both the read track metadata files and the container metadata files to update the mapping table.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
   a rotatable disk;
   a head configured to read data from the disk; and
   a controller configured to:
     write a plurality of track metadata files onto the disk with each track metadata file on a different track of the disk and the track metadata files located at track locations such that an angular skew between a first track metadata file located on a first track and a second track metadata file located on a second track is between an angle the disk rotates during a track-to-track seek time from the first track to the second track and 90 degrees, wherein the first track is adjacent to the second track; and
     read a plurality of track metadata files from the disk during one revolution of the disk using the head, wherein each track metadata file defines logical address to physical address mapping for a track of the disk.

2. The disk drive of claim 1, wherein the controller is further configured to:
   identify a last one of the plurality of track metadata files, to determine whether subsequent user data was written on the disk after the last track metadata file, and
   when the controller determines that the subsequent user data was written on the disk, read at least one container metadata file from a same track of the disk as the subsequent user data, the at least one container metadata file defining logical address to physical address mapping for the subsequent data.

3. The disk drive of claim 2, wherein the at least one container metadata file is interspersed with the subsequent user data on the same track of the disk.

4. The disk drive of claim 2, wherein the controller is configured to construct a mapping table from the read plurality of track metadata files and the read at least one container metadata file, the mapping table defining logical address to physical address mapping for user data on the disk.

5. The disk drive of claim 2, wherein the controller is configured to identify the last one of the plurality of track metadata files by examining time stamps in the track metadata files.

6. The disk drive of claim 1, wherein each track metadata file defines logical address to physical address mapping for user data located on a different track of the disk than the track metadata file.

7. The disk drive of claim 1, wherein each track metadata file defines logical address to physical address mapping for user data located on a plurality of tracks of the disk.

8. The disk drive of claim 1, wherein the controller is further configured to construct a mapping table from the read plurality of track metadata files, the mapping table defining logical address to physical address mapping for user data on the disk.

9. The disk drive of claim 1, wherein the controller is further configured to:
   read a mapping table from the disk using the head, the mapping table defining logical address to physical address mapping for user data on the disk, and
   update the mapping table using the read plurality track metadata files.

10. The disk drive of claim 1, wherein the controller is configured to read the plurality of track metadata files from three or more different tracks of the disk during the one revolution of the disk.

11. The disk drive of claim 10, further comprising an actuator configured to move the head to each of the three or more different tracks in a step-wise fashion during the one revolution of the disk.

12. The disk drive of claim 1, wherein the plurality of track metadata files are angularly spaced apart from one another by a fixed number of wedges on the disk.

13. A method of reading track metadata in a disk drive, the method comprising:
   rotating a disk; and
   reading a plurality of track metadata files from the disk during one revolution of the disk, wherein each track metadata file defines logical address to physical address mapping for a track of the disk, each track metadata file is located on a different track of the disk, and the track metadata files are located at track locations such that an angular skew between a first track metadata file located on a first track and a second track metadata file located on a second track is between an angle the disk rotates during a track-to-track seek time from the first track to the second track and 90 degrees, wherein the first track is adjacent to the second track.

14. The method of claim 13, further comprising:
   identifying a last one of the plurality of track metadata files;
   determining whether subsequent user data was written on the disk after the last track metadata file; and
   upon determining that the subsequent user data was written on the disk, reading at least one container metadata file from a same track of the disk as the subsequent user data, the container metadata file defining logical address to physical address mapping for the subsequent user data.

15. The method of claim 14, wherein the at least one container metadata file is interspersed with the subsequent user data on the same track of the disk.

16. The method of claim 13, wherein each track metadata file defines logical address to physical address mapping for user data located on a different track of the disk than the track metadata file.

17. The method of claim 13, wherein each track metadata file defines logical address to physical address mapping for user data located on a plurality of tracks of the disk.

18. The method of claim 13, further comprising constructing a mapping table from the read plurality of track metadata files, the mapping table defining logical address to physical address mapping for user data on the disk.

19. The method of claim 13, further comprising:
reading a mapping table from the disk, the mapping table defining logical address to physical address mapping for user data on the disk; and
updating the mapping table using the read plurality of track metadata files.

20. The method of claim 13, wherein the plurality of track metadata files are angularly spaced apart from one another by a fixed number of wedges on the disk.

* * * * *